(12) United States Patent
Bakalski (10) Patent No.: US 9,118,395 B2
(45) Date of Patent: Aug. 25, 2015

(54) CHIP COMPRISING A RADIO FREQUENCY SWITCH ARRANGEMENT, CIRCUIT ARRANGEMENT AND METHOD FOR PRODUCING A RADIO FREQUENCY CIRCUIT ARRANGEMENT

(75) Inventor: Winfried Bakalski, Munich (DE)

(73) Assignee: Infineon Technologies AG, Neubiberg (DE)

( * ) Notice: Subject to any disclaimer, the term of this patent is extended or adjusted under 35 U.S.C. 154(b) by 389 days.

(21) Appl. No.: 13/228,078

(22) Filed: Sep. 8, 2011

(65) Prior Publication Data

US 2012/0062306 A1    Mar. 15, 2012

(30) Foreign Application Priority Data

Sep. 9, 2010    (DE) .......................... 10 2010 040 512

(51) Int. Cl.
*H01P 1/10* (2006.01)
*H04B 1/44* (2006.01)
*H04B 1/00* (2006.01)
*H03K 17/00* (2006.01)

(52) U.S. Cl.
CPC .................. *H04B 1/44* (2013.01); *H04B 1/006* (2013.01); *H04B 1/0064* (2013.01)

(58) Field of Classification Search
CPC ..................................... H01P 1/10; H01P 1/15
USPC .................. 333/101, 103, 104; 327/416, 427; 455/78, 83
See application file for complete search history.

(56) References Cited

U.S. PATENT DOCUMENTS

| | | | |
|---|---|---|---|
| 6,236,840 B1 * | 5/2001 | Aihara et al. .................... 455/83 |
| 6,794,747 B2 * | 9/2004 | Takehara et al. ................ 257/705 |
| 7,138,846 B2 * | 11/2006 | Suwa et al. ..................... 327/308 |
| 7,161,197 B2 * | 1/2007 | Nakatsuka et al. ............. 257/270 |
| 7,337,547 B2 * | 3/2008 | Yasuda et al. .................. 333/103 |
| 7,391,282 B2 * | 6/2008 | Nakatsuka et al. ............. 333/103 |
| 7,636,004 B2 * | 12/2009 | Nakatsuka et al. ............. 327/308 |
| 7,773,956 B2 * | 8/2010 | Fukamachi et al. ............. 455/78 |
| 2004/0242132 A1 | 12/2004 | Hoshino et al. |
| 2010/0117713 A1 | 5/2010 | Katoh et al. |

* cited by examiner

*Primary Examiner* — Dean Takaoka
(74) *Attorney, Agent, or Firm* — Slater & Matsil, L.L.P.

(57) ABSTRACT

A chip includes an RF switch arrangement that has a plurality of RF switches arranged jointly on the chip. Each of the RF switches has at least one first RF connection accessible from outside the chip and one second RF connection accessible from outside the chip. Furthermore, each of the RF switches is designed to activate, in response to a driving, at least one RF path between two of its RF connections. The RF connections of different switches from among the RF switches are separated from one another in terms of radio frequency.

27 Claims, 6 Drawing Sheets

CHIP COMPRISING A RADIO FREQUENCY SWITCH ARRANGEMENT, CIRCUIT ARRANGEMENT AND METHOD FOR PRODUCING A RADIO FREQUENCY CIRCUIT ARRANGEMENT

This application claims priority to German Patent Application 10 2010 040 512.4, which was filed Sep. 9, 2010 and is incorporated herein by reference.

TECHNICAL FIELD

Exemplary embodiments of the present invention provide a chip includes a radiofrequency (RF) switch arrangement that can be used, for example, in mobile radio devices for changing over between different transmitting or receiving channels. Further exemplary embodiments of the present invention provide a circuit arrangement that can be used, for example, in mobile radio devices. Further exemplary embodiments provide a method for producing a radiofrequency circuit arrangement.

SUMMARY OF THE INVENTION

Exemplary embodiments of the present invention provide a chip including a radiofrequency switch arrangement (also designated as RF switch arrangement hereinafter). The RF switch arrangement has a plurality of RF switches arranged jointly on the chip. Each of the RF switches from the plurality of RF switches has at least one first RF connection accessible from outside the chip and one second RF connection accessible from outside the chip. Each of the RF switches from the plurality of RF switches is designed to activate, in response to a driving, at least one RF path between two of its RF connections. The RF connections of different switches from among the RF switches are separated from one another in terms of radio frequency.

Further exemplary embodiments of the present invention provide a circuit arrangement including a carrier substrate and a chip mentioned above. A first RF connection of a first RF switch arranged on the chip is coupled to a first connection of a second RF switch arranged on the chip via a conductive connection on the carrier substrate.

A further exemplary embodiment of the present invention provides a method for producing a radiofrequency circuit arrangement including a step of soldering a chip mentioned above, wherein first RF connections are electrically unconnected on the chip, onto a carrier substrate in order to produce, on the carrier substrate, an electrically conductive connection between at least some of the electrically unconnected first RF connections of the chip.

BRIEF DESCRIPTION OF THE DRAWINGS

Exemplary embodiments of the present invention are described in detail below with reference to the accompanying figures, in which.

DETAILED DESCRIPTION OF ILLUSTRATIVE EMBODIMENTS

Before exemplary embodiments are explained in greater detail below with reference to the accompanying figures, it is pointed out that identical elements or elements having identical functions are provided with the same reference symbols, and that a repeated description of these elements is omitted. Descriptions of elements having identical reference symbols are therefore mutually interchangeable.

Figure 1:
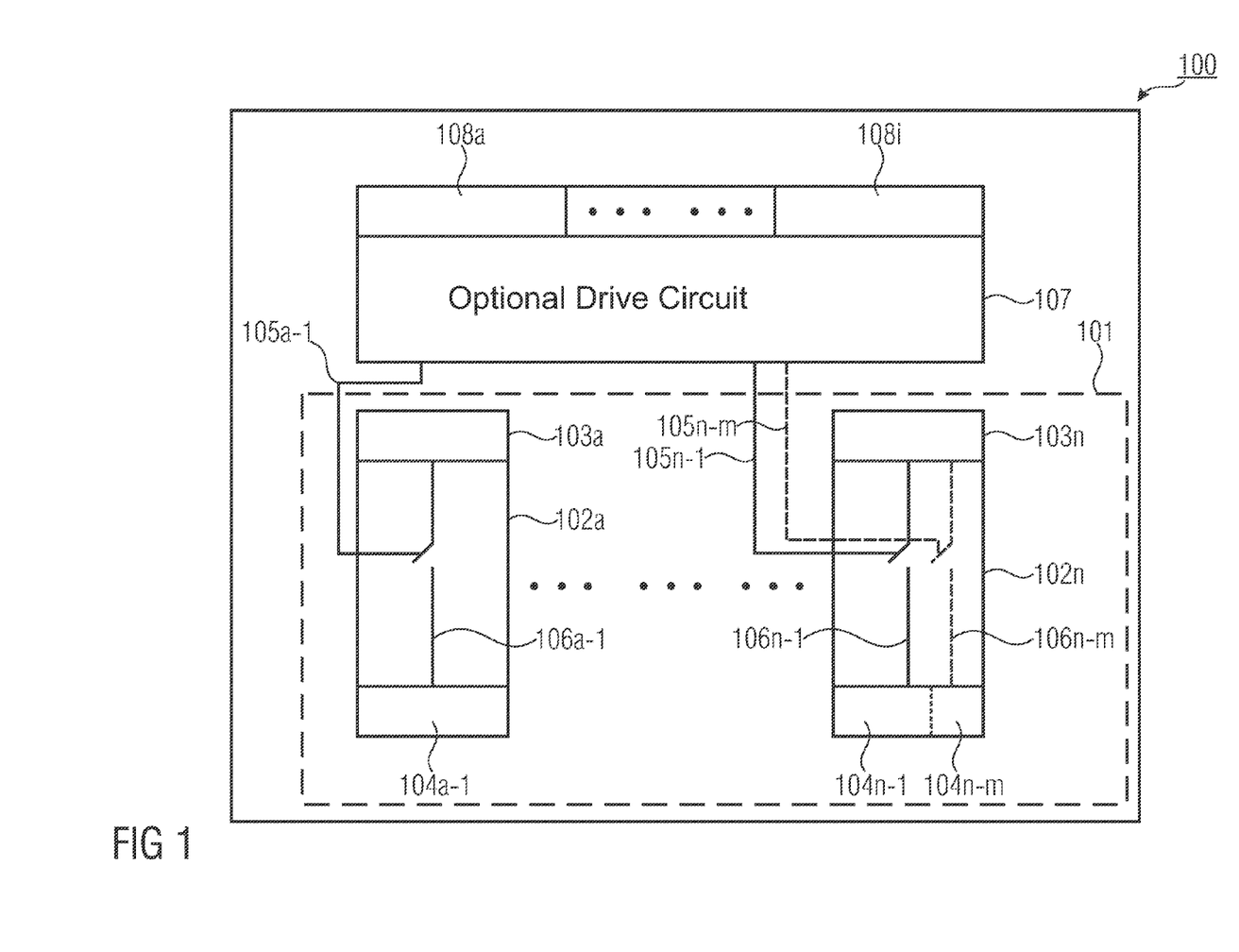
FIG. 1 shows a schematic illustration of a chip including an RF switch arrangement in accordance with one exemplary embodiment of the present invention.

FIG. 1 shows a schematic illustration of a chip 100 including an RF switch arrangement 101. The chip 100 has a plurality of RF switches 102a to 102n arranged jointly on the chip 100. Each of the RF switches 102a to 102n from the plurality of RF switches 102a to 102n has at least one first RF connection 103a to 103n accessible from outside the chip 100. Furthermore, each of the RF switches 102a to 102n from the plurality of RF switches 102a to 102n has a second RF connection 104a-1 to 104n-1 accessible from outside the chip 100. Furthermore, each of the RF switches 102a to 102n from the plurality of RF switches 102a to 102n is designed to activate, in response to a driving 105a-1 to 105n-1, at least one RF path 106a-1 to 106n-1 between two of its RF connections 103a to 103n, 104a-1 to 104n-1. The RF connections 103a to 103n, 104a-1 to 104n-1 of different switches from among the RF switches 102a to 102n are separated from one another in terms of radio frequency at least on the chip 100.

The variable n is a variable and can assume any natural value greater than one. The hyphen "-", in conjunction with a reference symbol (such as, for example, 104a-1), is intended to stand as demarcation for an additional index and not to be understood as a minus sign.

As can be seen from FIG. 1, the plurality of RF switches 102a to 102n can form the RF switch arrangement 101 of the chip 100 or the RF switches 102a to 102n can be part of the RF switch arrangement 101.

By virtue of the fact that the RF connections 103a to 103n, 104a-1 to 104n-1 of different switches from among the RF switches 102a to 102n are separated from one another in terms of radio frequency, the RF switch arrangement 101 can be varied in terms of its size, that is to say in terms of the number of those RF switches of the plurality of RF switches 102a to 102n which are coupled to a common connection.

In this case, the first RF connections 103a to 103n of the RF switches 102a to 102n can be designed, for example, to be coupled to one another and to an antenna or an antenna connection, such that, as a result of the activation of the associated RF paths 106a-1 to 106n-1 of the RF switches 102a to 102n, a signal can be passed from the first RF connections 103a to 103n via the RF paths 106a-1 to 106n-1 to the second RF connections 104a-1 to 104n-1 of the RF switches 102a to 102n.

Depending on the number of required RF paths in a circuit, only the first RF connections of those switches from among the RF switches 102a to 102n which are required for the desired application can be coupled to the antenna connection mentioned or the antenna mentioned. Thus, by way of example, if the RF paths 106a-1, 106b-1 are desired for an application, the first RF connections 103a, 103b can be coupled to one another and to the antenna connection or the antenna.

RF switches present on the chip, that is to say, for example, the RF switches 102c to 102n, which are not required for the desired application can remain unconnected, that is to say that their first connections, that is to say, for example, the first RF connections 103c to 103n, are not connected to the first connections 103a, 103b of the RF switches 102a, 102b whose RF paths 106a-1 to 106b-1 are required in the desired application. By virtue of the fact that these unused RF switches 102c to 102n, or their unused RF paths 106c-1 to 106n-1, are not coupled to the used RF switches 102a to 102b or the used RF paths 106a-1 to 106b-1, these unused RF switches 102c to 102n also cannot have any negative influence, for example, as a result of parasitic effects, on the used RF switches 102a, 102b. In other words, the RF paths 106c-1 to 106n-1 which are not required in the application are then also no longer physically connected to the antenna and therefore also cannot lead to any parasitic effects.

This is advantageous by comparison with alternative solutions wherein the first RF connections of the RF switches are all connected to one another on the chip. In these solutions, all RF paths in an associated application are then also coupled to the antenna or the antenna connection, as a result of which even unused RF paths are connected to the antenna, which can lead to undesirable effects, such as, for example, an (additional) insertion loss. If, by way of example, use were made of an SP8T switch (single pole 8 throw) having eight RF paths whose first RF connections are all connected to one another, and, by way of example, only five paths are intended to be used in the appropriate application, then there would always be three permanently unused RF paths at the antenna which entail parasitic capacitances at the antenna and all the other performance disadvantages such as harmonics and intermodulation products, which can be dependent on the transistor area.

An SP8T switch may also be designated hereinafter as SP8T for short.

By contrast, exemplary embodiments of the present invention enable a multiple switch, for example, which, upon connection of all first RF connections of the chip of the multiple switch, for example, on a carrier substrate on which the chip is arranged, can form an SP8T. In the case of that, however, furthermore, in a further application, only a portion of the first RF connections of the chip, for example, first RF connections 103a to 103e on the carrier substrate are coupled to one another and to the antenna or the antenna connection. The three unrequired RF paths of the chip or their first RF connections can then remain unconnected and therefore have no negative effects on the RF paths connected via the carrier substrate of the multiple switch.

In the present application, a chip is understood to be an independent component which can be present, for example, in a package or as a so-called "flip-chip". In this case, a so-called wafer, for example, in the form of a silicon wafer, typically has a multiplicity (in some cases thousands) of mutually independent chips. The chip 100 as shown in FIG. 1 is therefore typically sawn out from the wafer, in the same way as a multiplicity of other individual (for example, identical) chips, during production. In other words, in the present application, a chip is intended to be understood to be a singulated chip. A singulated chip can be designated by the technical term "die". The chip can be, for example, an unpackaged chip, that is to say a chip without a package ("bare die") or alternatively a packaged chip.

Furthermore, the individual RF switches from the plurality of RF switches 102a to 102n can be single switches or multiple switches. Thus, by way of example, a first RF switch 102a can be a single switch. In this case, the single switch 102a has an RF path 106a-1 between its first RF connection 103a and its second RF connection 104a-1.

An n-th RF switch 102n can be a multiple switch, for example. This multiple switch 102n can have a plurality of m RF paths 106n-1 to 106n-m. In other words, the multiple switch 102n can be a 1 to m multiple switch, where m is a variable and can assume any natural value greater than one. Therefore, the multiple switch 102n can have a first RF connection 103n, which is connected to all the transmission paths 106n-1 to 106n-m of the multiple switch 102n. Furthermore, the multiple switch 102n can have a plurality of second RF connections 104n-1 to 104n-m separated from one another (for example, by switch components) in terms of radio frequency. In this case, each of the RF paths 106n-1 to 106n-m of the RF switch 102n can be connected between the common first RF connection 103n of the RF switch 102n and a respective second RF connection, associated only with the RF path, from the plurality of RF connections 104n-1 to 104n-m separated from one another in terms of radio frequency.

In other words, the chip 100 can be, for example, part of an RF switch having a common connection and m+1 changeover connections connected thereto (for example, designated as SP(m+1)T switch), where the chip 100 has a single switch having one connection and one changeover connection connected thereto (for example, designated as SP1T switch) and a multiple switch having one connection and m changeover connections connected thereto (for example, designated as SP(m)T switch). Of course, here it is also possible to use further variants in accordance with exemplary embodiments of the present invention.

In accordance with further exemplary embodiments, as can be seen in FIG. 1, the chip 100 can optionally furthermore have a drive circuit 107 arranged on the chip 100, the drive circuit being designed to provide a driving 105a-1 to 105n-m for each of the RF switches 102a to 102n from the plurality of RF switches 102a to 102n in such a way that at any point in time (apart from parasitic overlaps that occur, if appropriate, during changeover operations) overall at most one RF path 106a-1 to 106n-m of the RF switches 102a to 102n of the chip 100 is activated, such that a simultaneous activation of a plurality of RF paths 106a-1 to 106n-m of the RF switches 102a to 102n is avoided.

In other words, changeover instants at which, for example, one RF path is deactivated while another RF path is activated and at which a plurality of RF paths can momentarily be active on account of parasitic effects are intended to be disregarded here. In other words, the statement at any point in time holds true for all points in time, apart from changeover instants at which undesired or undefined states of the chip 100 can occur on account of parasitic effects.

In other words, the drive circuit 107 is designed to provide the drivings 105a-1 to 105n-m in such a way that, in the case of the chip 100, there is always at most one RF path of the chip 100 active. This also holds true for the case where at least one or a plurality of the RF switches 102a to 102n of the chip 100 is or are a multiple switch having a plurality of RF paths. That is to say that within an RF switch 102a to 102n, too, there is always a maximum of one RF path of the RF switch (for example, the RF path 106n-1 of the multiple RF switch 102n) activated, while no other RF path of the RF switch or of another RF switch 102a to 102n of the chip 100 is active.

The drive circuit 107 can have a common logic table for driving the plurality of RF switches 102a to 102n. In the logic table, table entries are allocated to the RF paths 106a to 106n of the RF switches 102a to 102n in such a way that each table entry in the logic table is allocated to at most one RF path 106a to 106n of the RF switches 102a to 102n. A table entry can be selected by means of an external selection signal which enables the selection of a switching state or codes a switching state. The switching state coded in the selection signal corresponds to a table value of the logic table. The drive circuit 107 can select and activate the RF path to which the decoded table entry is allocated, and deactivate the previously activated RF path.

This correspondingly also holds true for the case where at least one or a plurality of the RF switches 102a to 102n is or are a multiple switch having a plurality of RF paths. In this case, each RF path of the multiple switch is also allocated a dedicated table entry in the logic table which is not allocated to any further RF path of the chip 100.

Therefore, on the basis of the drive signal using the logic table for each RF path 106a-1 to 106n-m, the drive circuit 107 can provide a driving 105a-1 to 105n-m or a drive signal 105a-1 to 105n-m in order to activate or deactivate the respective RF path 106a-1 to 106n-m. In the case of use of multiple switches (for example, use of the multiple switch 102n), too, the drive circuit can provide a dedicated driving (for example, in the form of drive signals 105a-1 to 105n-m) for each RF path (that is to say, for example, for the RF paths 106a-1 to 106n-m of the multiple switch 102n).

The RF switches 102a to 102n whose RF connections 103a to 103n, 104a-1 to 104n-m are separated from one another in terms of radio frequency are therefore connected to the common drive circuit 107. This is advantageous in comparison with an alternative solution wherein two RF switches arranged on separate chips are used, since, in the case of such an alternative solution, for each RF switch a dedicated drive circuit would be present on its chip, which would lead to a larger required area for this arrangement and furthermore to a larger required number of control lines for the drive circuits of the two chips.

In accordance with some exemplary embodiments, the drive circuit 107 can have a plurality of digital drive connections 108a to 108i arranged on the chip and accessible from outside the chip, wherein i is a variable and can assume any natural value greater than or equal to one. In this case, the drive circuit 107 is designed to activate one of the RF paths 106a-1 to 106n-m of the RF switches 102a to 102n on the basis of signal levels at the digital drive connections 108a to 108i. The signal levels at the digital drive connections 108a to 108i can form the drive signal mentioned, on the basis of which the drive circuit 107 in conjunction with the logic table selects and activates the RF path to be activated. Thus, the table values result, for example, from the signal levels at the digital drive connections 108a to 108i, wherein each drive connection represents a bit position of the table entries having a dedicated significance. Thus, for example, a first driving connection 108a can represent a bit position of the table entries having the significance $2^0$ and an i-th drive connection 108i can represent a bit position having a significance $2^{i-1}$. That is to say that the drive signal can be a parallel signal and the drive circuit 107 can be designed to receive the parallel signal. In accordance with further exemplary embodiments, however, the drive circuit 107 can also be designed to receive a serial drive signal, for example, at a single drive connection of the drive circuit 107.

The logic table can be designed such that only a maximum of one RF path of the RF paths 106a-1 to 106n-m is active per logic state, that is to say per table entry. This enables a comparatively small number of logic states (for example, corresponding to the number of RF paths 106a-1 to 106n-m) and hence a small number of digital drive connections.

Therefore, in an application, for example, exemplary embodiments of the present invention can provide an SP8T wherein the chip having the associated 8 RF paths of the SP8T has only three digital drive connections 108a to 108c. As a simple example, the chip of the SP8T could have a 6-throw multiple switch and a 2-throw multiple switch, the RF connections of which are separated from one another. If only an SP6T is then required instead of an SP8T, in an application the 2-throw multiple switch would simply not be connected to an antenna connection. By contrast, if the full SP8T were required, the first (common) RF connection of the 2-throw multiple switch of the chip can be connected to the first (common) RF connection of the 6-throw multiple switch of the chip, for example, via an external wiring, on a carrier substrate of the SP8T. The SP8T would then have, as already described, three drive connections (the three drive connections of the chip). If, alternatively, use were made of an SP6T on one chip and an SP2T on a further chip, in order to obtain a modular SP8T, then this would end in five drive connections, since each of the two chips has a dedicated driving for its RF paths.

In accordance with further exemplary embodiments, the logic table of the drive circuit 107 can be designed such that, when one of the drive connections 108a to 108i is left open, only the RF paths of the RF switches 102a to 102n are deactivated whose allocated table entries at a binary digit of the table entries which is allocated to the drive connection left open have a value complementary to a signal level of the drive connection left open.

If, by way of example, in the case of the abovementioned chip having an SP2T switch and an SP6T switch, one of the three drive connections 108a to 108c is left open, then four RF paths of this chip can still be used. If, by way of example, the drive connection provided with the highest binary digit in the table entries is left open, then the RF paths to which the table entries 0 to 3 are assigned can still be activated. This may be, for example, four of the RF paths of the SP6T present in the chip. The remaining four RF paths of the SP6T and of the SP2T can then no longer be activated. Thus, in the case in which use of selected RF paths or complete RF switches of the chip 100 is not desired, drive lines of one or a plurality of the drive connections 108a to 108i of the chip 100 can be saved, which can lead to a lower wiring outlay. In an application, the unrequired drive connections 108a to 108i can be left open, for example, but can also be pulled to a fixed signal level by external circuitry. In order that the drive connections 108a to 108i can be left open without any problems, the chip 100 can have at the drive connections 108a to 108i in each case a pull-up or pull-down resistor which pulls the drive connections 108a to 108i, if the latter are left open, to a desired (digital) signal level.

In accordance with some exemplary embodiments, the RF switches 102a to 102n can be designed such that a connection between two RF connections of the RF switches 102a to 102n, the RF connections being coupled to an RF path of the RF switches 102a to 102n, has a lower impedance for a useful frequency signal of the chip 100 at least by a factor of 1000, 500, 200, 100, or 50, in an activated state of the RF path than in a second phase, in which the RF path is deactivated.

A useful frequency signal of the chip 100 can have a frequency range of 100 MHz to 10 GHz, for example. However, the chip 100 can also be designed for useful signals in a different frequency range.

Figure 2:
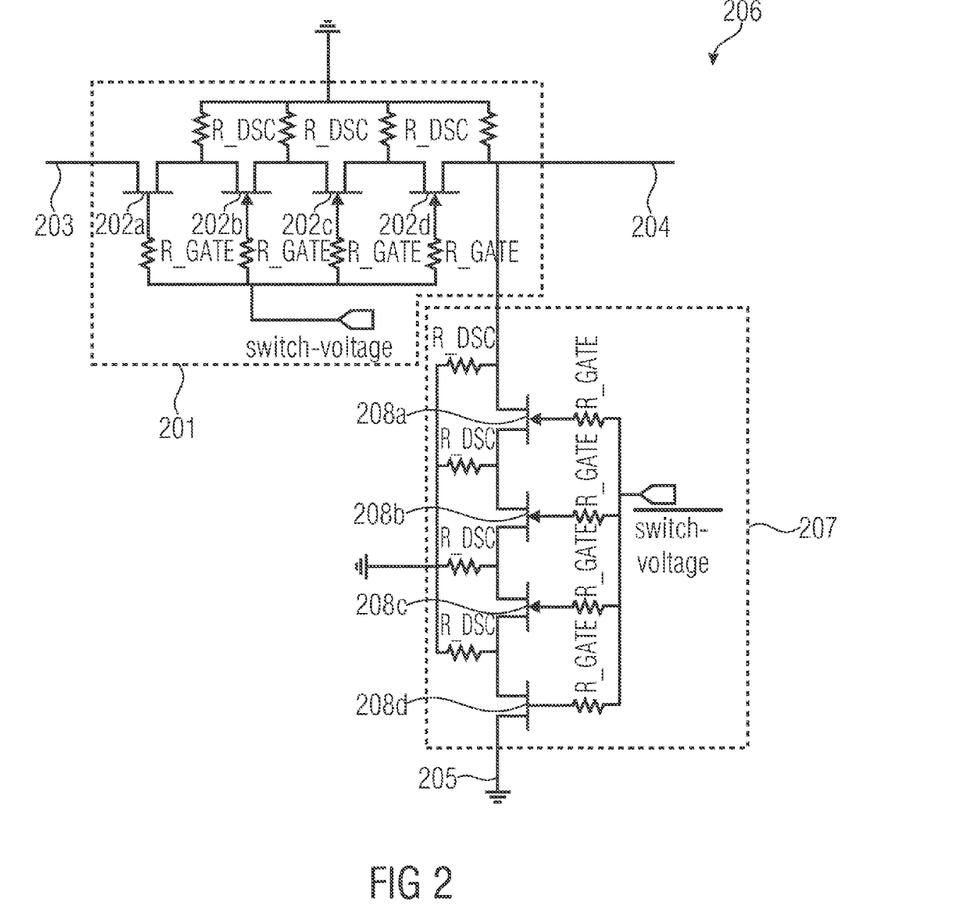
FIG. 2 shows a circuit diagram of a possible RF path such as can be used in RF switches in accordance with exemplary embodiments of the present invention.

FIG. 2 shows a circuit diagram of an RF path 206. This RF path 206 can correspond in terms of its function, for example, to the RF path 106a-1 to 106n-m shown in FIG. 1 and can have the optional details shown in FIG. 2. The RF path 206 shown in FIG. 2 can thus also be used in multiple switches, wherein, in accordance with the "size" of the multiple switches, a corresponding number of these RF paths 206 are present in the respective multiple switch. Thus, by way of example, in an m-throw multiple switch, m of the RF paths 206 can be present. These m RF paths can typically be connected to one another at a first RF connection (for example the first RF connection 103n of the m-throw multiple switch 102n).

The RF path 206 shown in FIG. 2 has a longitudinal transmission path 201 having a plurality of longitudinal switching transistors 202a to 202d between two RF connections 203, 204, which can be RF connections of an associated RF switch. In this case, the RF switch having the RF path 206 (that is to say, for example, one of the RF switches 102a to 102n) is designed to activate the RF path 206 by activating the longitudinal switching transistors 202a to 202d. Activation of the longitudinal switching transistors 202a to 202d therefore produces a connection having low impedance for a useful frequency signal between the two RF connections 203, 204, such that, for example, a signal can flow along load paths of the longitudinal switching transistors 202a to 202d from the first RF connection 203 to the second RF connection 204. The first RF connection 203 can correspond to one of the first RF connections 103a to 103n, and the second RF connection 204 can correspond to one of the second RF connections 104a-1 to 104n-m, for example.

Since it may be desired for only one RF path of a chip to be active at any point in time in accordance with one exemplary embodiment of the present invention, chips in accordance with exemplary embodiments of the present invention can be designed such that at most longitudinal switching transistors 202a to 202d of exactly one RF path of the chip are active at any point in time.

In some exemplary embodiments, the RF path 206 can have a transverse transmission path 207 having a plurality of transverse switching transistors 208a to 208d. In this case, the transverse transmission path 207 is connected between the second RF connection 204 of the associated RF switch and an RF reference potential connection 205 of the associated RF switch. In this case, the RF switch is designed, in an active state of the RF path 206, to activate the longitudinal switching transistors 202a to 202d of the longitudinal transmission path 201 and to deactivate the transverse switching transistors 208a to 208d of the transverse transmission path 207, and, in a deactivated state of the RF path 206, to deactivate the longitudinal switching transistors 202a to 202d of the longitudinal transmission path 201 and to activate the transverse switching transistors 208a to 208d of the transverse transmission path 207. Consequently, in the case of a multiple RF switch, the different longitudinal transmission paths 201 of the RF paths (such as, for example, the RF paths 106n-1 to 106n-m) on one side of the RF paths can be connected to a common first RF connection (for example, the first RF connection 103n) and, at another end, the RF paths can each be connected to a dedicated second RF connection separated from the other second RF connections in terms of radio frequency (for example, each RF path of the RF paths 106n-1 to 106n-m can be connected to exactly one of the RF connections 104n-1 to 104n-m). The transverse transmission paths of these RF paths of an RF switch can then be connected between these second RF connections, separate from the other RF paths, and the RF reference potential connection 205 of the RF switch. The RF reference potential connection 205 can also form an RF reference potential connection of the entire chip or of at least one part of the chip and therefore have the same potential for all the RF switches of the chip.

Some details of the RF path 206 are described below. The longitudinal transmission path 201 can form, for example, a connection between a transmitting connection and an antenna (or an antenna connection) or a receiving connection and an antenna (or an antenna connection). The transverse transmission path 207 can serve, for example, for improving the isolation. That is to say that crosstalk of the transistors (via the substrate or the gate/drain or gate/source resistors) is thus prevented. In order to be able to switch higher voltage levels and powers even in the case of more recent technologies with relatively small breakdown voltages, as shown in FIG. 2, the longitudinal switching transistors 202a to 202d and also the transverse switching transistors 208a to 208d are stacked, that is to say that a plurality of transistors are connected in series. In the example shown in FIG. 2, four transistors in each case are stacked in order to be able to switch a multiple of the permitted drain-source voltage (for example, quadruple the latter).

If, as already described, the desire is to construct an 8-throw switch, that is to say, for example, an SP8T switch, then eight of these paths can be present or even required at the antenna.

If, in an alternative realization, wherein the antenna is directly connected to all first RF connections of the eight RF paths, only five paths, for example, were used, there would always be three RF paths at the antenna which bring along parasitic capacitances at the antenna and all the other performance disadvantages such as harmonics, intermodulation products, which can be dependent on the transistor area. Since, in exemplary embodiments of the present invention, these first RF connections are separated from one another in terms of radio frequency, in an application it is possible for only the RF paths which are also actually required to be connected to the antenna and RF paths which are not required are then not physically connected to the antenna and, therefore, also cannot have any negative influences on the antenna.

As shown in FIG. 2, some exemplary embodiments of the present invention provide radiofrequency switches having radiofrequency paths which are realized in a common gate configuration.

Figure 3:
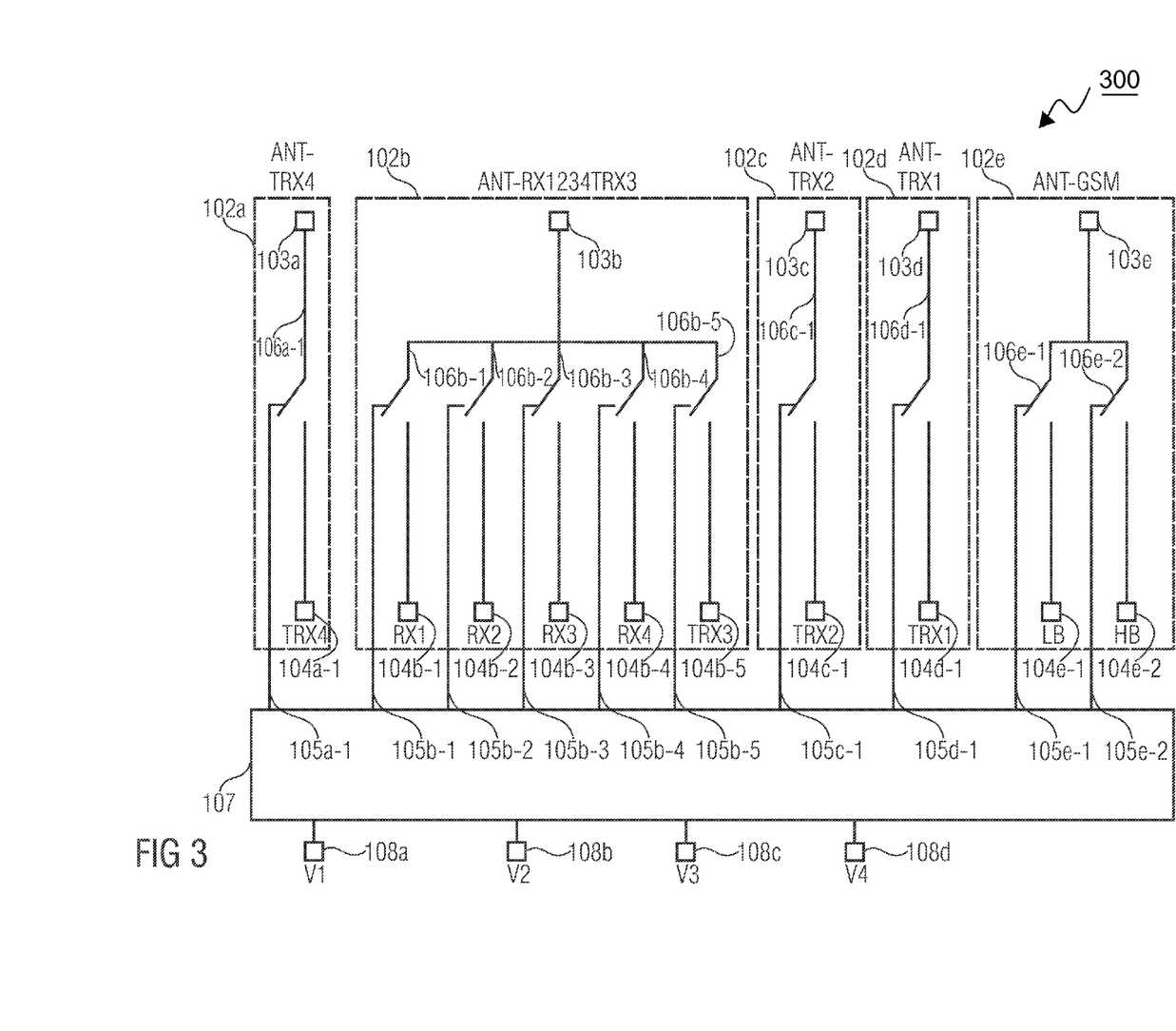
FIG. 3 shows a schematic illustration of a chip including an RF switch arrangement in accordance with one exemplary embodiment of the present invention.

FIG. 3 shows a schematic illustration of a chip 300 including a switch arrangement in accordance with an exemplary embodiment of the present invention. The chip 300 shown in FIG. 3 can correspond in terms of its functionality, for example, to the chip 100 shown in FIG. 1 and can have further optional details.

The chip 300 comprises five RF switches 102a to 102e. A first RF switch 102a is a first single switch 102a. The first single switch 102a therefore also has one RF path 106a-1. The second RF switch 102b is a first multiple switch, more precisely a 5-throw multiple switch 102b. This 5-throw multiple switch 102b has five RF paths 106b-1 to 106b-5. A third RF switch 102c is a second single switch 102c having one transmission path 106c-1. A fourth RF switch 102d is a third single switch 102d having one transmission path 106d-1. A fifth RF switch 102e is a second multiple switch, more precisely a 2-throw switch 102e having two transmission paths 106e-1 and 106e-2.

The chip 300 furthermore has a drive circuit 107, which can correspond in terms of its functionality to the drive circuit 107 shown in FIG. 1. In details, however, the drive circuit 107 in FIG. 3 can differ from the drive circuit 107 in accordance with FIG. 1 or be improved relative thereto.

The first single switch 102a has a first RF connection 103a associated with it and a second RF connection 104a-1 associated with it. In this case, the single switch 102a is designed, on the basis of a driving, to activate exactly one RF path (its RF path 106a-1), between its first RF connection 103a and its second RF connection 104a-1. This is correspondingly the situation with the single switches 102c, 102d and their associated RF connections 103c, 103d, 104c-1, 104d-1 and their respective RF paths 106c-1, 106d-1.

In contrast to the single switches, the first multiple switch 102b has an associated common first RF connection 103b, which is connected to all the RF paths 106b-1 to 106b-5 of the first multiple switch 102b. Furthermore, the first multiple switch 102b has a plurality of associated second RF connections 104b-1 to 104b-5 which are separated from one another in terms of radio frequency and which are respectively connected only to one RF path of the RF paths 106b-1 to 106b-5 of the first multiple switch 102a. In other words, the first multiple switch 102b has an associated common first RF connection 103b and a plurality of associated second RF connections 104b-1 to 104b-5 which are separated from one another in terms of radio frequency.

Furthermore, the second multiple switch 102e has an associated common first RF connection 103e, which is connected to all the RF paths 106e-1 to 106e-2 of the second multiple switch 102e. Furthermore, the second multiple switch 102e has a plurality of second RF connections 104e-1 to 104e-2 which are separated from one another and which are respectively connected only to one RF path of the RF paths 106e-1 to 106e-2 of the second multiple switch 102e. In other words, the second multiple switch 102e has an associated common first RF connection 103e and a plurality of associated second RF connections 104e-1 to 104e-2 which are separated from one another in terms of radio frequency.

The chip 300 can furthermore be designed to activate at any point in time at most one radiofrequency path from the plurality or totality of radiofrequency paths of the multiple switches. More precisely, the chip 300 can be designed to activate at any point in time at most one RF path from the plurality of RF paths 106a-1 to 106e-2 of the chip 300.

As can be seen in FIG. 3, the drive circuit 107 can provide each RF path 106a-1 to 106e-2 of the chip 300 with a dedicated drive signal 105a-1 to 105e-2 for the activation of the respective RF path.

The chip 300 shown by way of example in FIG. 3 can be connected up in an application in order to form a multiple changeover switch having a common connection and a maximum of 10 connections that can be changed over. The drive circuit 107 can have, in order to drive all the RF paths of the chip 300 separately from one another, four digital drive connections 108a to 108d for the control of the drive circuit 107 (the drive connections 108a to 108d are also designated as V1-V4 in FIG. 3). A maximum driving of up to sixteen RF paths is possible with these four drive connections 108a to 108d.

The chip 300 shown in FIG. 3, using the same number of drive connections, by adding further RF paths to the chip 300 (as parts of single switches or multiple switches of the chip 300), could be connected up in an application in order to be able to realize a multiple changeover switch having a common connection and sixteen connections that can be changed over.

In the illustration shown in FIG. 3, the first RF connection 103a of the first single switch 102a is designated as ANT-TRX4 and the second RF connection 104a-1 is designated as TRX4. The first (common) RF connection 103b of the first multiple switch 102b is designated as ANT-RX1234TRX3 and the second RF connections 104b-1 to 104b-5 separated from one another in terms of radio frequency are designed as RX1, RX2, RX3, RX4 and TRX3. A first RF connection 103c of the second single switch 102c is designated as ANT-TRX2 in FIG. 3 and a second RF connection 104c-1 is designated as TRX2. A first RF connection 103d of the third single switch 102d is designated as ANT-TRX1 in FIG. 3 and a second RF connection 104d-1 of the second single switch 102d is designated as TRX1. A first (common) RF connection 103e of the second multiple switch 102e is designated as ANT-GSM in FIG. 3 and second RF connections 104e-1 to 104e-2 of the second multiple switch 102e which are separated from one another in terms of radio frequency are identified as LB and HB in FIG. 3.

In this case, by way of example, the second multiple switch 102e can be used in an application for changing over between the two useful bands of the GSM standard (GSM—global system for mobile communication).

The chip 300 (alternatively the chip 100) can be a so-called "flip-chip die", for example, that is to say that the latter is designed for soldering onto a carrier substrate, such that the RF connections accessible from outside the chip are in contact with the carrier substrate and can be connected to conductive elements of the carrier substrate. Depending on what application is envisaged with the chip, a different number of RF paths can be required. Depending on this, by way of example, an antenna line on the carrier substrate can be connected only to selected first RF connections of the RF switches 102a to 102e via a conductive connection on the carrier substrate. That is to say that if, in the application of the chip 300, all first RF connections (which can also be designated as antenna bumps and can be arranged, for example, in the center of the chip 300) are connected via an external circuitry interconnection, an SP10T switch is effectively obtained on account of the external circuitry interconnection of the chip 300. However, if an SP9T switch or SP8T switch having correspondingly better performance data (such as, for example, a lower insertion loss) is preferred, then, for example, the TRX4 path (that is to say the RF path 106a-1 of the first single switch 102a) or the TRX4/TRX2 paths (the RF paths 106a-1, 106c-1) is or are intentionally not connected up. In this case, the corresponding path is physically also no longer connected to the antenna and therefore cannot lead to any parasitic effects either. In other words, in exemplary embodiments of the present invention, the antenna line on the chip is intentionally not connected, in order to define the final configuration only by means of the soldering of the "flip-chip die". This is achieved by virtue of the fact that the first RF connections of the RF switches of the chip are separated from one another in terms of radio frequency, that is to say are unconnected, thus making it possible that the final configuration can only be defined by the soldering of the "flip-chip die" onto a substrate.

Furthermore, the logic table of the drive circuit 107 can also be designed accordingly. If, by way of example, three logic lines are typically required for the driving of an SP8T switch, then typically four logic lines (which can be connected to the drive connections 108a to 108d) are already required in the case of an SP10T switch. Therefore, the logic table can be designed such that, in the case of non-use of the corresponding paths (that is to say, for example, of some signal paths of the SP10T switch), the additional logic path (that is to say one of the drive connections 108a to 108d) is not required either. By way of example, the fourth pad, for example, a fourth drive connection 108d, can be put at logic 1 in order to activate the additional RF paths (which can be driven with the fourth drive connection 108d) (for example, the RF paths 106e-1 to 106e-2). If said logic pad is not connected, then it can automatically always be at logic 0 and leads to non-use of the fourth drive connection 108d. In this case, therefore, no logic line to the fourth drive connection 108d is required either.

Figure 4:
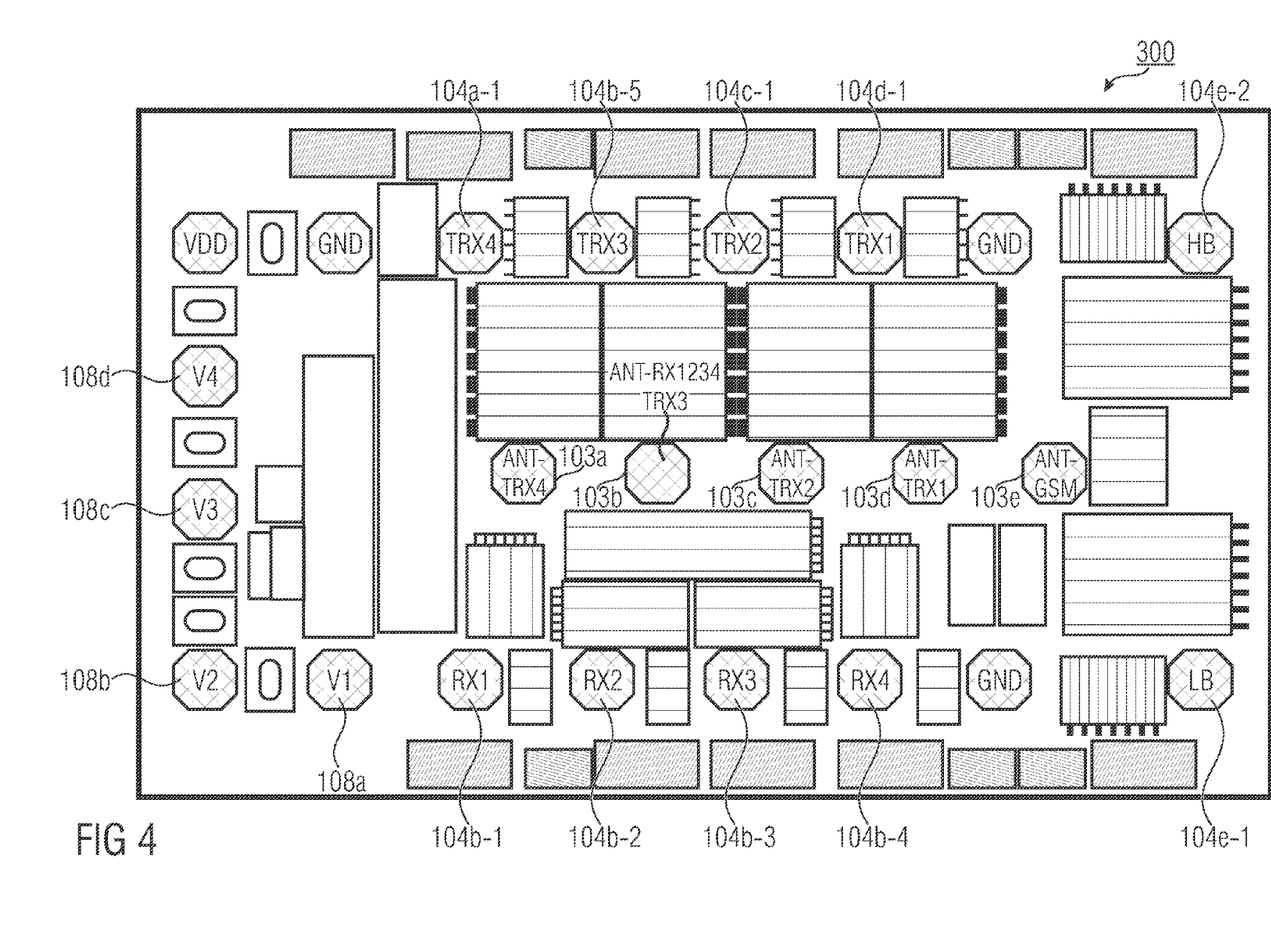
FIG. 4 shows an illustration of a possible chip layout of the chip shown in FIG. 3.

FIG. 4 shows a possible layout of the chip 300 shown in FIG. 3, which chip can be connected up externally in an application in order to be able to realize at most an SP10T switch. As can be seen from the layout in FIG. 4, the first RF connections 103a to 103e of the plurality of RF switches 102a to 102e of the chip 300 can be arranged adjacent to one another on the chip 300.

More precisely, the first RF connections 103a to 103e of the plurality of RF switches 102a to 102e can be arranged along a line on the chip 300, such that each of the first RF connections 103a to 103e has one or two adjacent first RF connections 103a to 103e, such that no other connection accessible from outside the chip 300 is present between two adjacent first RF connections 103a to 103e. This arrangement of the first RF connections 103a to 103e in a line enables a simple connection of these first RF connections 103a to 103e in an application, for example, with the aid of a conductive connection of a carrier substrate onto which the chip 300 is soldered. The first RF connections 103a to 103e can be connected to one another, for example, by means of a continuous conductive connection of the carrier substrate, the connection being coupled to an antenna or an antenna connection, for example. In accordance with further exemplary embodiments, it is also possible for only a portion of the first RF connections 103a to 103e to be connected to one another and to an antenna or an antenna connection in an application by means of a conductive connection on the carrier substrate. Thus, by way of example, only one conductive connection between the two first RF antenna connections 103a, 103b of the RF switches 102a, 102b can be produced on the carrier substrate in order to form an SP6T. In this case, the first RF connections 103c to 103e of the RF switches 102c to 102e of the chip 300 remain electrically isolated from one another and from the first RF connections 103a, 103b of the RF switches 102a, 102b.

As furthermore becomes evident from the layout of the chip 300, the first RF connections 103a to 103e of the plurality of RF switches 102a to 102e can be arranged in a center of the chip 300, and the second RF connections 104a-1 to 104e-2 can be arranged at an edge of the chip 300 which extends around the center of the chip 300.

To summarize, exemplary embodiments of the present invention enable the antenna line (or the antenna connections of the various RF switches) intentionally not to be connected, in order that the final configuration is only defined by the soldering of the "flip-chip die" (of the chip 300). In this case, exemplary embodiments of the present invention provide a design or a layout of a switch without a connection of the antenna line (or without a connection of the antenna connections or first RF connections of the various RF switches). Depending on the application, the antenna line can, for example, be connected on the printed circuit board or be connected via a redistribution layer, for example, in the case of wafer level packages. In comparison with alternative concepts in which the antenna lines (or antenna connections) are already connected on the chip, exemplary embodiments of the present invention can have the same size or, in other words, the chip 300 will not shrink per se in terms of its size, but a higher number of a type of chip can then be produced, which has the advantages that only one monomask set is needed in fabrication and qualification and testing technology has to be implemented only once. Furthermore, in an application, the unused paths (RF paths which are not required in the application) can be completely separated and therefore no longer lead to losses of performance, since these unused paths cannot have any parasitic effects on the paths used in the application.

Exemplary embodiments of the present invention can provide a chip with which, given a corresponding chip-external connection of RF connections of the chip in the maximum expansion level, it is possible to realize an SP10T switch (or smaller or larger), for example, which, however, can be reduced to a smaller switch as necessary.

The chip 300 shown in FIG. 4 is, in terms of its conception, an SP10T (that is to say that it enables an SP10T switch to be realized given a corresponding chip-external connection of the first connections of the RF switches 102a to 102e), which, however, can also alternatively be used as SP9T, SP8T, SP7T, SP6T, SP5T, SP4T, SP3T, SP1T, wherein those RF paths which are not required in an application can respectively not be connected to the antenna line and in this case have no negative influences on the antenna line. One advantage of exemplary embodiments of the present invention is, therefore, that one component can be used for different modules.

FIGS. 5A to 5D show different configurations for circuit arrangements in accordance with exemplary embodiments of the present invention. An explanation is given of how a preceding chip (for example, the chip 300) can be connected up externally in different ways in order to obtain multiple switches having a common connection and a differing number of changeover connections. It becomes clear on the basis of the examples that, through the use of chips in accordance with exemplary embodiments of the present invention, multiple switches having a different number of RF paths can be provided by means of one and the same chip. In this case, on account of the fact that the RF connections in the case of chips in accordance with exemplary embodiments of the present invention are separated from one another in terms of radio frequency and the RF connections are connected to one another and to an antenna line only via an external conductive connection, RF switches of the chip which are not required in the respective application are not connected to the RF switches of the chip which are required in the application. The RF switches which are not required (and are not used in the application) therefore do not have any negative parasitic effects on the RF switches which are required (and are used in the application).

Each of the circuit arrangements shown schematically in FIGS. 5A to 5D has a carrier substrate and a chip (arranged on the carrier substrate) in accordance with an exemplary embodiment of the present invention. The chip 300 in accordance with FIG. 2 is preferably used in FIGS. 5A to 5D, but it is also possible for some other chip in accordance with an exemplary embodiment of the present invention to be arranged on the carrier substrate of the circuit arrangements in FIGS. 5A to 5D.

FIGS. 5A to 5D symbolically illustrate a common driving, which is intended to indicate that all the RF switches are controlled by a common drive circuit (for example, the drive circuit 107) and that each RF path of the RF switches 102a to 102e can be activated and deactivated independently of another RF path of the RF switches 102a to 102e.

Figure 5A:
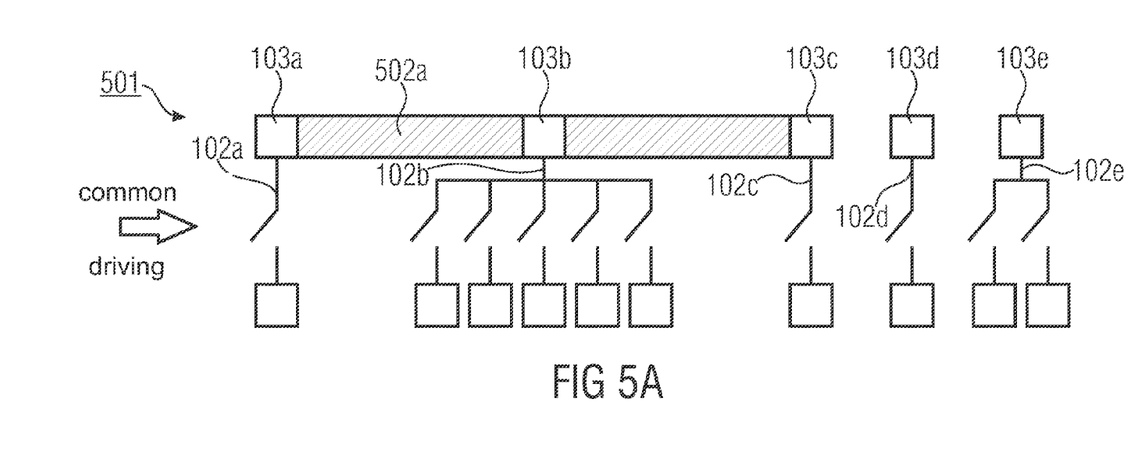
FIGS. 5A to 5D show schematic illustrations of different configurations of circuit arrangements in accordance with further exemplary embodiments of the present invention.

FIG. 5A shows a schematic illustration of a circuit arrangement 501 in accordance with a further exemplary embodiment of the present invention. In the case of the circuit arrangement 501 shown, the first RF connection 103a of the first RF switch 102a, that is to say of the first single switch 102a, is connected to the first RF connection 103b of the second RF switch 102b (that is to say of the first multiple switch 102b) and to the first RF connection of the third RF switch 102c (that is to say of the second single switch 102c) via a conductive connection 502a of a carrier substrate of the circuit arrangement 501. The conductive connection 502a can be coupled to an antenna or an antenna connection, for example, on the carrier substrate. The first RF connection 103d of the fourth RF switch (that is to say of the third single switch 102d) and the first RF connection 103e of the fifth RF switch 102e (that is to say of the second multiple switch 102e) are not connected to one another nor are they connected to the conductive connection 502a. Therefore, the circuit arrangement 501 forms a 1:7 RF switch, that is to say an SP1T switch, on the basis of the conductive connection of the two single switches 102a, 102c and the multiple switch 102b. In accordance with further exemplary embodiments, the second multiple switch 102b can generally also be an x-throw switch, such that the circuit arrangement 501 forms a 1:(x+1+1) RF switch. If all first RF connections 103a to 103e of the RF switches 102a to 102e were connected in that case, a 1:(x+1+1+1+2) RF switch could maximally be formed. Furthermore, various other possibilities for the choice of the number of RF paths per RF switch 102a to 102e and also the choice of the number of RF switches per chip can be used.

Figure 5B:
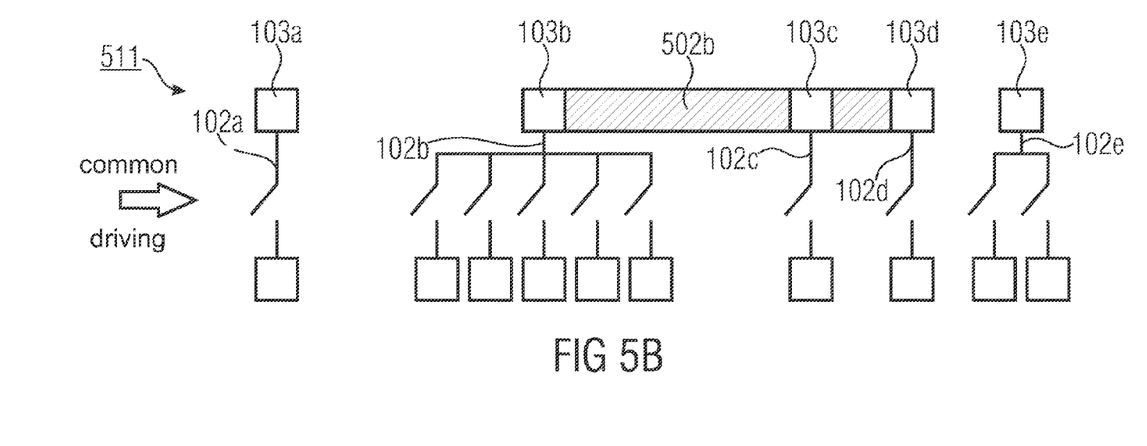

FIG. 5B shows a schematic illustration of a circuit arrangement 511 in accordance with a further exemplary embodiment of the present invention. In the case of the circuit arrangement 511, the first RF connection 103b of the first RF switch 102b is connected to the first RF connection 103c of the second RF switch 102c and the first RF connection 103d of the third RF switch 102d. Therefore, the circuit arrangement 511, in the same way as the circuit arrangement 501 already, forms a 1:7 RF switch, but it uses the third RF switch 102d instead of the first RF switch 102a. This can be advantageous, for example, if the transmission paths of the RF switches 102a, 102d which are intended to be guided along the transmission paths of the RF switches 102a, 102d differ in their construction.

Figure 5C:
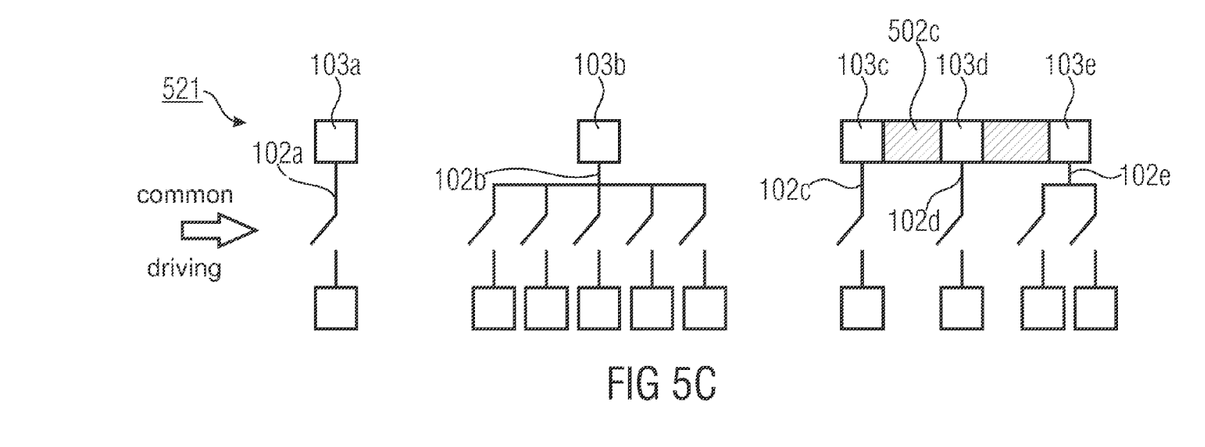

FIG. 5C shows a schematic illustration of a circuit arrangement 521 in accordance with a further exemplary embodiment of the present invention. In the case of the circuit arrangement 521, the first RF connection 103c of the third RF switch 102c is connected to the first RF connection 103d of the fourth RF switch 102d and the first RF connection 103e of the fifth RF switch 102e. In an embodiment of the fifth RF switch 102e as a 2-throw multiple switch, as is shown in FIG. 5C, the circuit arrangement 521 therefore forms a 1:4 RF switch, formed by the single switches 103c, 103d and the 2-throw multiple switch 102e. By contrast, the first RF connections 103a, 103b of the RF switches 102a, 102b remain open.

Figure 5D:
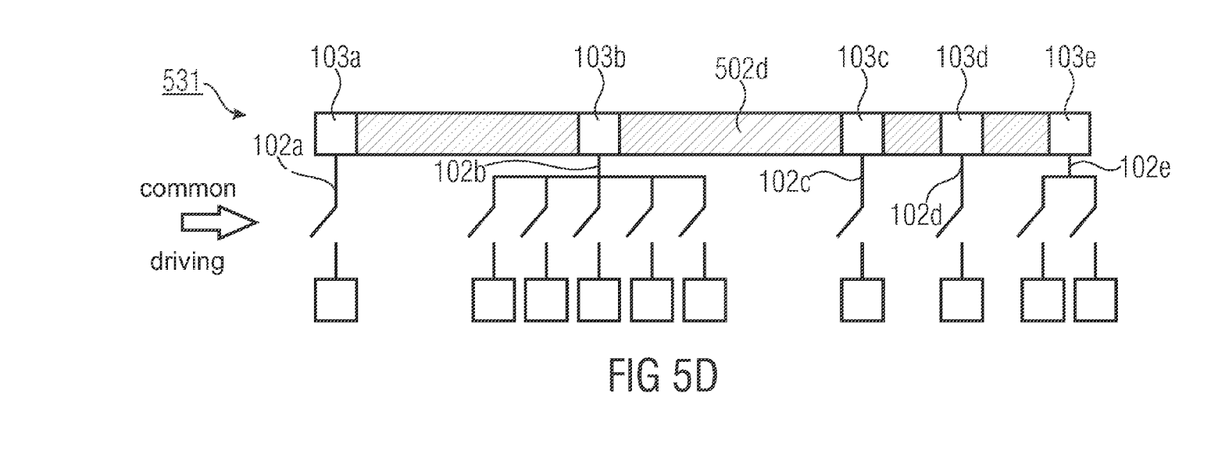

FIG. 5D shows a schematic illustration of a circuit arrangement 531 in accordance with a further exemplary embodiment of the present invention. In the case of the circuit arrangement 531, all the first RF connections 103a, 103b, 103c, 103d, 103e are connected to one another via a conductive connection 502d. The circuit arrangement 531 thus constitutes the maximum possible expansion stage in the circuitry interconnection of the chip 300. The circuit arrangement 531 therefore realizes a 1:10 RF switch, or SP10T. If the first multiple switch 102b is chosen as an x-throw multiple switch, instead of a 5-throw multiple switch, and the second multiple switch 102e is chosen as a y-throw multiple switch instead of a 2-throw multiple switch, then the circuit arrangement 531 can form a 1:(x+y+3) RF switch. x and y are variables and can assume any desired natural value.

The circuit arrangements shown in FIGS. 5A to 5D are intended only to be examples; of course, other possibilities for the connection of the first RF connections 103a to 103e are furthermore possible as well, such that, as already described above, it is possible to realize any desired 1:x RF switches with the concept of the present invention. The choice of the chip 300 including one 5-throw multiple switch, one 2-throw multiple switch and three single switches is also intended to serve merely as an example. In further exemplary embodiments of the present invention, therefore, it is also possible to use other combinations of RF switches.

It should be mentioned that the RF connections of the chip 300 which are accessible from outside the chip typically form the topmost layer of the chip 300 (apart from passivation and protective layers). In the chip 300, no layer in which RF connections of different RF switches of the chip 300 are connected to one another is situated below the topmost layer of the RF connections. In the case of the circuit arrangements shown in FIGS. 5A to 5D, the desired first RF connections of the chip 300 are only connected on the carrier substrate, that is to say only after the conclusion of the production of the chip 300 in a separate assembling process. The carrier substrate can be, for example, a ceramic substrate or a printed circuit board substrate (for example, including FR4 material) and can be different than a substrate of the chip 300. The electrically conductive connection between desired first RF connections of the chip 300 can be effected in the separate assembling step, for example, in a bonding process or a soldering process. The electrically conductive connections in the case of the circuit arrangements in FIGS. 5A to 5D are therefore not parts of the chip 300. The electrically conductive connections can be connected to the desired RF connections of the chip 300, for example, by means of soldering material which can be connected to the chip 300 in the separate assembling step. The electrically conductive connections can be, for example, conductor tracks of the carrier substrate or bonding wires. The above explanations can also apply, of course, to further chips (for example, to the chip 100) in accordance with exemplary embodiments of the present invention.

By way of example, the desired first RF connections of the chip can be connected on a printed circuit board via a redistribution layer, for example, in the case of wafer level packages. In this case, the redistribution layer is not part of the chip, but rather is only produced during the production of the circuit arrangement.

Exemplary embodiments of the present invention therefore provide a chip which enables radiofrequency switches in a wide variety of configurations. Depending on the number of frequency bands and operating modes, any configuration can theoretically be possible, for example, in a telephone (or in some other mobile radio device) from a simple receiving/transmitting switch (also designated as RX/TX switch) through to a 10-throw switch (also designated as SP10T—single pole 10 throw) and beyond. In contrast to components which have been designed in a very system-specific manner and in the case of which cost-effectiveness is not always achieved because, for example, a configuration is required only in relatively small numbers, and, consequently, production is no longer worthwhile, radiofrequency switches including chips in accordance with exemplary embodiments of the present invention can achieve high cost-effectiveness since, in this case, the chips will not be designed in an application-specific or system-specific manner, rather the same chip can be used for different applications (for example, a different number of frequency bands).

Although some aspects have been described in connection with a device, it goes without saying that these aspects also constitute a description of the corresponding method, such that a block or a component of a device should also be understood as a corresponding method step or as a feature of a method step. Analogously to this, aspects described in connection with or as a method step also constitute a description of a corresponding block or detail or feature of a corresponding device.

What is claimed is:

1. A chip comprising a radiofrequency switch arrangement, the chip comprising:
   a plurality of RF switches arranged jointly on the chip;
   wherein each of the RF switches from the plurality of RF switches has at least one separate first RF connection accessible from outside the chip and one separate second RF connection accessible from outside the chip and is configured to activate, in response to a driving, at least one RF path between two of its RF connections;
   wherein the RF connections of different switches from among the RF switches are separated from one another in terms of radio frequency; and
   a drive circuit arranged on the chip, the drive circuit being configured to provide, for each RF switch from the plurality of RF switches, a driving in such a way that at any point in time overall at most one RF path of the RF switches of the chip is activated, such that simultaneous activation of a plurality of RF paths of the RF switches is avoided.

2. The chip as claimed in claim 1, wherein the first RF connections of the plurality of RF switches are arranged in a center of the chip, and wherein the second RF connections of the plurality of RF switches are arranged at an edge of the chip which extends around the center of the chip.

3. The chip as claimed in claim 1, wherein the drive circuit has a common logic table for driving the RF paths of the RF switches, wherein, in the logic table, table entries are allocated to RF paths of the RF switches in such a way that each table entry is allocated to at most one RF path of the RF switches.

4. The chip as claimed in claim 3,
   wherein the drive circuit has a plurality of digital drive connections which are arranged on the chip and accessible from outside the chip; and
   wherein the drive circuit is configured to activate an RF path of the RF switches on the basis of signal levels at the digital drive connections.

5. The chip as claimed in claim 4, wherein the logic table of the drive circuit is configured such that, when one of the digital drive connections is left open, only the RF paths of the RF switches are permanently deactivated whose allocated table entries at a binary digit of the table entries which is allocated to the digital drive connection left open have a value complementary to a signal level of the drive connection left open.

6. The chip as claimed in claim 1,
   wherein at least one of the RF switches from the plurality of RF switches is a multiple switch;
   wherein the multiple switch has an associated common first RF connection and a plurality of associated second RF connections which are isolated from one another in terms of radio frequency;
   wherein the multiple switch also has a plurality of switchable RF paths between its RF connections; and
   wherein each of the RF paths is connected between the common RF connection of the multiple switch and a second RF connection, coupled only to the respective RF path, from the plurality of RF connections which are isolated from one another in terms of radio frequency.

7. The chip as claimed in claim 6, wherein the chip is configured to activate, at any point in time, on the basis of the driving, at most one RF path from the plurality of RF paths of the multiple switch.

8. The chip as claimed in claim 1, wherein at least one of the RF switches from the plurality of RF switches is a single switch having an associated first RF connection and an associated second RF connection, wherein the single switch is configured to activate, on the basis of the driving, exactly one RF path between its associated first RF connection and its associated second RF connection.

9. The chip as claimed in claim 1, wherein RF paths of the RF switches between two RF connections have a longitudinal transmission path having a plurality of longitudinal switching transistors, wherein each of the RF switches is configured to activate an RF path by activating the longitudinal switching transistors of the respective RF path.

10. The chip as claimed in claim 9, wherein the chip is configured such that at any point in time at most longitudinal switching transistors of exactly one RF path of the chip are active.

11. The chip as claimed in claim 9,
    wherein the plurality of the RF switches have transverse transmission paths assigned to their RF paths, having a plurality of transverse switching transistors, between an RF connection of the RF switch, said RF connection being connected only to the assigned RF path, and an RF reference potential connection of the chip; and
    wherein the RF switches are configured in such a way as, in an active state of an RF path, to activate the associated longitudinal transmission path and to deactivate the associated transverse transmission path and, in a deactivated state of the RF path, to deactivate the associated longitudinal transmission path and to activate the associated transverse transmission path.

12. The chip as claimed in claim 1, wherein the first RF connections of the plurality of RF switches are arranged adjacent to one another on the chip.

13. The chip as claimed in claim 1, wherein the first RF connections of the plurality of RF switches are arranged along a line on the chip, such that each of the first RF connections has one or two adjacent first RF connections, such that no other connection accessible from outside the chip is present between two adjacent first RF connections.

14. The chip as claimed in claim 1, wherein the at least one separate first RF connections of each RF switch in a subset of the plurality of RF switches are configured to be coupled together and to an antenna.

15. The chip as claimed in claim 14, wherein the at least one separate first RF connections of each RF switch in the subset of the plurality of RF switches is coupled together and to the antenna through a conductive connection on a carrier substrate separate from the chip.

16. The chip as claimed in claim 14, wherein at least one RF switch of the plurality of RF switches is not coupled to the subset or the antenna and is permanently unused.

17. A circuit arrangement comprising:
    a carrier substrate;
    a chip comprising a radiofrequency switch arrangement, the chip comprising:
        a plurality of RF switches arranged jointly on the chip, wherein each of the RF switches from the plurality of RF switches has at least one first RF connection accessible from outside the chip and one second RF connection accessible from outside the chip and is configured to activate, in response to a driving, at least one RF path between two of its RF connections, and
        wherein the RF connections of different switches from among the RF switches are separated from one another in terms of radio frequency; and
    wherein a first RF connection of a first RF switch arranged on the chip is coupled to a first RF connection of a second RF switch arranged on the chip via a conductive connection on the carrier substrate, wherein the carrier substrate is bonded to the chip.

18. The circuit arrangement as claimed in claim 17, wherein the chip furthermore has a third RF switch, the first RF connection of which is not coupled to the first RF connection of the first RF switch and the first RF connection of the second RF switch.

19. The circuit arrangement as claimed in claim 18, wherein at least one RF switch of the plurality of RF switches of the chip is a single switch, and wherein at least one further RF switch of the plurality of RF switches of the chip is a multiple switch.

20. The circuit arrangement as claimed in claim 19, wherein the first RF switch is an x-throw multiple switch and the second RF switch is a y-throw multiple switch, such that the circuit arrangement forms at least one 1 to (x+y) RF switch.

21. The circuit arrangement as claimed in claim 20, wherein the chip furthermore has a fourth RF switch, which is a single switch, wherein a first RF connection of the single switch is connected to the first RF connection of the x-throw multiple switch and to the first RF connection of the y-throw multiple switch in such a way that the circuit arrangement forms at least one 1 to (x+y+1) RF switch.

22. The circuit arrangement as claimed in claim 17, wherein the chip has a drive circuit having a plurality of drive connections that are arranged on the chip and are accessible from outside the chip, wherein at least one of the drive connections is not connected on the carrier substrate or is connected to a supply potential connection of the circuit arrangement.

23. A chip comprising a radiofrequency switch arrangement, the chip comprising:
    a plurality of RF switches arranged jointly on the chip;
    wherein each of the RF switches from the plurality of RF switches has at least one first RF connection accessible from outside the chip and one second RF connection accessible from outside the chip and is configured to activate, in response to a driving, at least one RF path between two of its RF connections;
    wherein the RF connections of different switches from among the RF switches are separated from one another in terms of radio frequency; and
    wherein RF paths of the plurality of RF switches are configured such that a connection between two RF connections of the RF switches, said RF connections being coupled to an RF path of the RF switches has lower impedance for a useful frequency signal of the chip at least by a factor of 100 in a first phase, in which the RF path is activated, than in a second phase, in which the RF path is not activated.

24. A chip comprising a radiofrequency switch arrangement, the chip comprising:
    a plurality of RF switches arranged jointly on the chip;
    wherein each of the RF switches from the plurality of RF switches has at least one first RF connection accessible from outside the chip and one second RF connection accessible from outside the chip and is configured to activate, in response to a driving, at least one RF path between two of its RF connections;
    wherein at least one RF switch of the plurality of RF switches of the chip is a single switch, and wherein at least one further RF switch of the plurality of RF switches of the chip is a multiple switch; and
    wherein a first RF switch of the plurality of RF switches is an x-throw multiple switch and a second RF switch of the plurality of RF switches is a y-throw multiple switch, such that the switch arrangement is configurable to form at least one 1 to (x+y) RF switch when the first RF connection of the x-throw multiple switch is conductively coupled to the first RF connection of the y-throw multiple switch.

25. The chip as claimed in claim 24, wherein the chip furthermore has a third RF switch, which is a single switch, wherein a first RF connection of the single switch is connected to the first RF connection of the x-throw multiple switch and to the first RF connection of the y-throw multiple switch in such a way that the switch arrangement forms at least one 1 to (x+y+1) RF switch.

26. A method for producing a radiofrequency circuit arrangement, the method comprising:
    soldering a chip, wherein first RF connections are electrically unconnected on the chip, onto a carrier substrate in order to produce, on the carrier substrate, an electrically conductive connection between at least some of the electrically unconnected first RF connections of the chip,
    wherein the chip comprises:
        a plurality of RF switches arranged jointly on the chip;
        wherein each of the RF switches from the plurality of RF switches has at least one first RF connection accessible from outside the chip and one second RF connection accessible from outside the chip and is configured to activate, in response to a driving, at least one RF path between two of its RF connections; and
        wherein the RF connections of different switches from among the RF switches are separated from one another in terms of radio frequency.

27. The method of claim 26, further comprising leaving at least on RF switch of the plurality of RF switches permanently electrically unconnected on the chip.

* * * * *